United States Patent
Kitagawa (10) Patent No.: US 11,718,246 B2
(45) Date of Patent: Aug. 8, 2023

(54) NOISE SHIELDING STRUCTURE

(71) Applicant: HONDA MOTOR CO., LTD., Tokyo (JP)

(72) Inventor: Akihiro Kitagawa, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 44 days.

(21) Appl. No.: 17/495,164

(22) Filed: Oct. 6, 2021

(65) Prior Publication Data

US 2022/0111805 A1 Apr. 14, 2022

(30) Foreign Application Priority Data

Oct. 9, 2020 (JP) ................................. 2020-170899

(51) Int. Cl.
*B60R 13/08* (2006.01)
*B60R 19/48* (2006.01)

(52) U.S. Cl.
CPC .......... *B60R 13/0884* (2013.01); *B60R 19/48* (2013.01)

(58) Field of Classification Search
CPC ..... B60R 13/0884; B60R 13/08; B60R 13/02; B60R 19/02; B60R 19/18; B60R 19/48; B62D 25/08; B62D 25/20; G10K 11/002
USPC ....................... 293/117, 104; 296/181.6, 39.3
See application file for complete search history.

(56) References Cited

U.S. PATENT DOCUMENTS

| | | | |
|---|---|---|---|
| 2009/0314576 A1* | 12/2009 | Vilcek .................... | B60R 13/08 |
| | | | 181/284 |
| 2013/0049393 A1* | 2/2013 | Kurogi ................... | B62D 25/20 |
| | | | 296/30 |
| 2017/0274850 A1* | 9/2017 | Aizawa ................... | B60R 19/18 |

FOREIGN PATENT DOCUMENTS

| | | | | |
|---|---|---|---|---|
| JP | S57-90274 U | | 6/1982 | |
| JP | S5790274 U | * | 6/1982 | ............ B60K 13/04 |
| JP | S63-43937 U | | 3/1988 | |
| JP | 2000-128027 A | | 5/2000 | |
| JP | 2003-137050 A | | 5/2003 | |
| JP | 2003137050 A | * | 5/2003 | ............ B60R 19/18 |
| KR | 20020074876 A | * | 10/2002 | ............ B60R 19/18 |
| KR | 20210039006 A | * | 4/2021 | ............ B60R 19/48 |

OTHER PUBLICATIONS

Eda H, machine translation of JP2003137050A Vehicle Rear Part Structure, EPO Espacenet, May 2003 (Year: 2003).*

(Continued)

*Primary Examiner* — Jason S Morrow
*Assistant Examiner* — Wenwei Zhuo
(74) *Attorney, Agent, or Firm* — Rankin, Hill & Clark LLP (57) ABSTRACT

A noise shielding structure is provided that is highly versatile with no limitation to vehicle models and bumper designs, and effectively reduces road noise in the rear compartment. The noise shielding structure includes: an outer panel at a rear vehicle body; a rear bumper provided so as to cover the outer panel; and a noise shield arranged between the outer panel and the rear bumper, wherein the noise shield includes a fixed portion to be fixed to the outer panel and a flap portion to contact the rear bumper when the rear bumper is attached to the rear vehicle body, and the flap portion is deformable on a hinge of the noise shield provided between the fixed portion and the flap portion.

10 Claims, 7 Drawing Sheets

(56) References Cited

OTHER PUBLICATIONS

Nakano Yoshiaki, machine translation of JPS5790274U, EPO Espacenet, Jun. 1982 (Year: 1982).*
Japanese Office Action received in corresponding Japanese application No. 2020-170899 dated Aug. 2, 2022 with English translation (9 pages).

* cited by examiner

NOISE SHIELDING STRUCTURE

CROSS-REFERENCE TO RELATED APPLICATION

This application claims the benefit of priority to Japanese Patent Application No. 2020-170899 filed on Oct. 9, 2020, the disclosures of all of which are hereby incorporated by reference in their entireties.

TECHNICAL FIELD

The present invention relates to a noise shielding structure.

BACKGROUND OF THE INVENTION

A noise shielding structure arranged around a bumper has been known to have a noise shield comprising an undercover having an end edge portion thereof attached along a bumper skirt (see Japanese Patent Application Publication No. 2000-128027A, hereinbelow referred to as Patent Document 1, for example). Such a noise shielding structure allows a noise shield to reduce so-called road noise, propagated from below a vehicle to an interior of the vehicle while the vehicle is travelling.

SUMMARY OF THE INVENTION

Problems to be Solved

In the meanwhile, it is desirable nowadays to improve quietness in the rear compartment of a vehicle with three rows of sheets, such as a minivan. For the purpose of preventing the transmission of road noise to the rear compartment, a noise shielding structure having the aforementioned undercover (see Patent Document 1, for example) may be applied to a rear vehicle body. However, when such a noise shielding structure is installed to the rear vehicle body, the undercover (noise shield) may interfere with other components, such as an exhaust pipe, adjacent thereto, depending on a vehicle model. In addition, the design of a bumper may differ from grade to grade even between the same vehicle models. Accordingly, applying a conventional noise shielding structure (see Patent Document 1, for example) to a vehicle requires manufacturing a noise shield for every bumper design, to increase manufacturing costs.

The present invention is thus intended to provide a noise shielding structure that is highly versatile with no limitation to vehicle models and bumper designs, and effectively reduces road noise in the rear compartment.

Solution to Problem

A noise shielding structure of the present invention, as a solution to the above-identified problem, includes: an outer panel at a rear vehicle body; a rear bumper provided so as to cover the outer panel; and a noise shield arranged between the outer panel and the rear bumper, wherein the noise shield includes a fixed portion to be fixed to the outer panel and a flap portion to contact the rear bumper when the rear bumper is attached to the rear vehicle body, and the flap portion is deformable on a flexible portion of the noise shield provided between the fixed portion and the flap portion.

Advantageous Effects of the Invention

The noise shielding structure according to the present invention is highly versatile with no limitation to vehicle models and bumper designs, and effectively reduces road noise in the rear compartment.

EMBODIMENTS OF THE INVENTION

Hereinafter, a description is given in detail of a noise shielding structure of an embodiment to implement the present invention, with reference to the drawings as required. The noise shielding structure of the present embodiment is characterized in that a noise shield has a fixed portion to be fixed to an outer panel at a rear vehicle body, and a flap portion which is connected to the fixed portion via a flexible portion, working as a hinge with respect to the fixed portion, and abuts against a rear bumper partially covering the outer panel.

Figure 1:
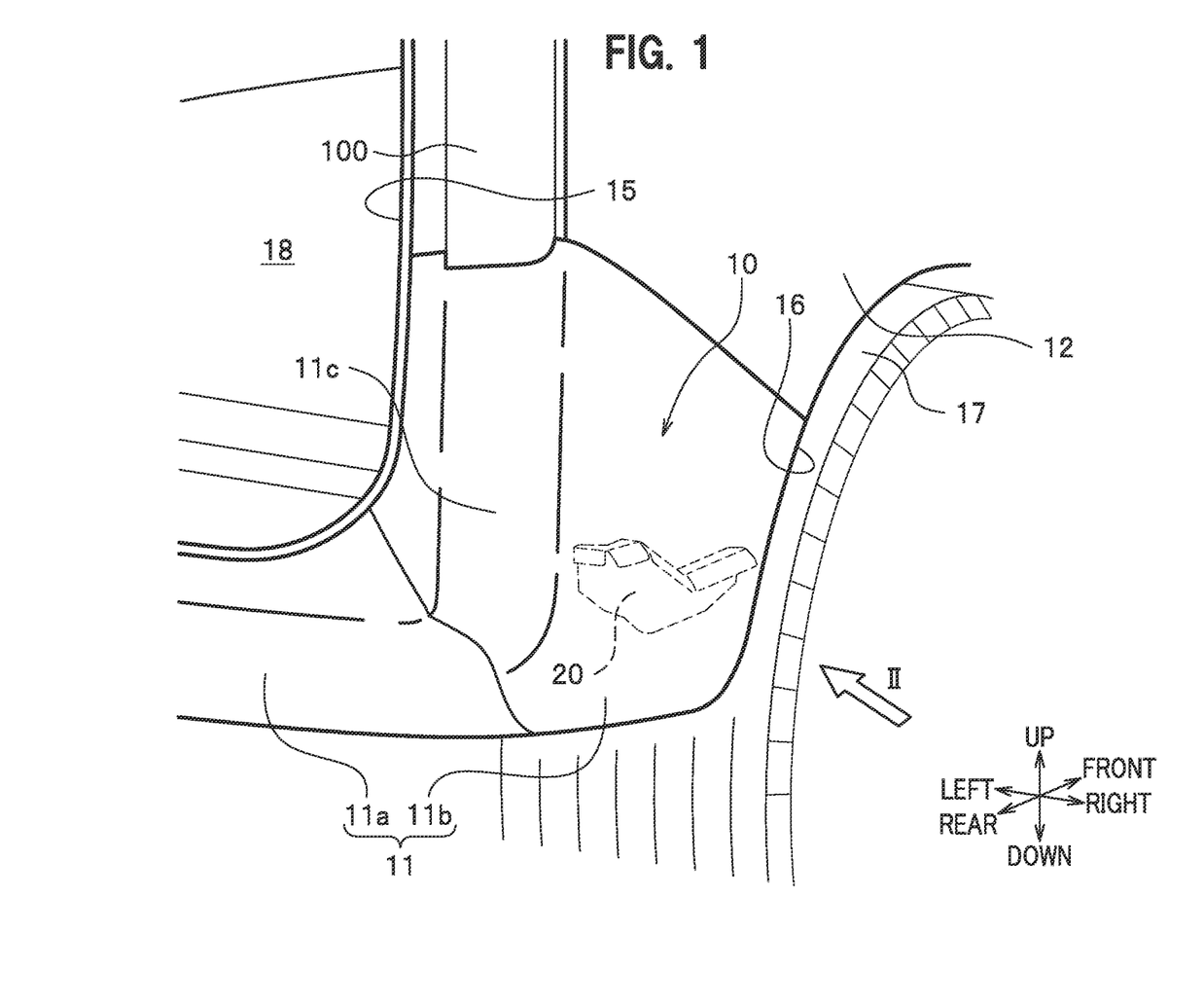
FIG. 1 is a perspective view of a partially-enlarged rear vehicle body provided with a noise shielding structure according to an embodiment of the present invention.
Figure 2:
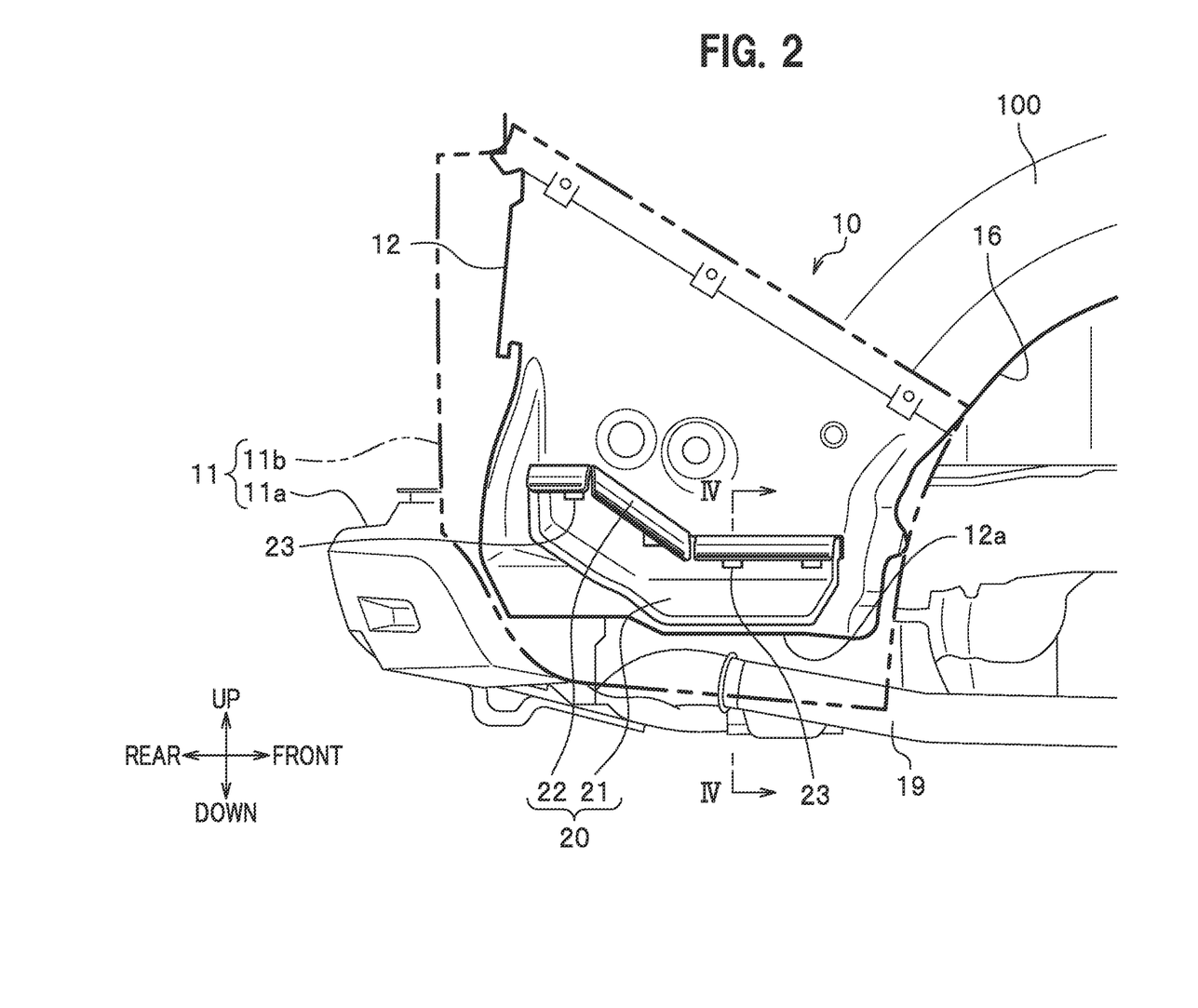
FIG. 2 is a lateral view of the noise shielding structure, as viewed from a direction II in FIG. 1, to show a noise shield attached to an outer panel, seeing through a rear bumper indicated by an imaginary line.

FIG. 1 is a perspective view of a partially-enlarged rear vehicle body provided with a noise shielding structure 10. Specifically, FIG. 1 shows a right end of a rear bumper 11 (rear bumper face), as viewed diagonally from behind, and on the right side of, a vehicle 100. The directions of front-rear, up-down, and right-left indicated by arrows in FIG. 1 are identical to those of the vehicle 100. FIG. 2 is a lateral view of the noise shielding structure 10, as viewed from a direction II in FIG. 1. However, FIG. 2 does not show a side face 11b of the rear bumper 11 covering an outer panel 12 from outside of the vehicle, for the purpose of illustration. Accordingly, FIG. 2 shows a noise shield 20 attached to the outer panel 12, seeing through the side face 11b indicated by an imaginary line (phantom line).

A description is first given of the vehicle 100 used for the present embodiment and mounted with the noise shielding structure 10. As shown in FIG. 1, the vehicle 100 used for the present embodiment and mounted with the noise shielding structure 10 is assumed to be a vehicle, such as a minivan, having a tail gate opening 15 on a rear side thereof.

However, a vehicle having the noise shielding structure 10 of the present embodiment applied thereto is not limited to such a vehicle.

The rear bumper 11 is arranged under the rear vehicle body, as shown in FIG. 1. Specifically, the rear bumper 11 has a bumper body 11a extending in a vehicle width direction (right-left direction in FIG. 1) along a lower side of the tail gate opening 15, and the side face 11b located at either end in the vehicle width direction of the bumper body 11a.

The bumper body 11a is arranged to cover a rear face of a rear panel (not shown) forming a lower side of the tail gate opening 15. The side face 11b is formed to partially cover a lateral vehicle body, while an up-down width thereof increasing from that of the bumper body 11a with an increasing distance from an end of the bumper body 11a. Then, a front edge of the side face 11b forms a wheel arch 16, jointly with the outer panel 12 forming a side face of the vehicle. A bent portion 11c is formed between the bumper body 11a and the side face 11b and it is bent so as to smoothly continue from the side face of the vehicle to the rear face of the vehicle. Note that a reference sign 20 indicates a noise shield arranged on a back side of the side face 11b (inside in the vehicle width direction), a reference sign 17 indicates a tire, and a reference sign 18 indicates a rear compartment.

The outer panel 12 extends along the front-rear and up-down directions of the vehicle 100 so as to substantially form a lateral portion of the vehicle, as shown in FIG. 1. The outer panel 12 then forms the wheel arch 16 so as to follow the tire 17. In addition, the outer panel 12 has a lower edge 12a extending rearward from a lower end of a rear edge of the wheel arch 16, in a lateral view of the vehicle in FIG. 2. Specifically, the lower edge 12a extends from a location closer to the wheel arch 16 to a location closer to the bumper body 11a, just above an exhaust pipe 19. A part of the outer panel 12, forming the lower edge 12a, is covered in FIG. 2 by the side face 11b (indicated by a phantom line) of the rear bumper 11.

Next, a description is given of the noise shielding structure 10 (see FIG. 1) of the present embodiment. As shown in FIG. 1, the noise shielding structure 10 includes the noise shield 20 (indicated by a dotted line). Note that a description is given below of the noise shield 20 of the noise shielding structure 10 (see FIG. 1) arranged on the right side of the vehicle body, but it goes without saying that the noise shield 20 may be arranged also on the left side of the vehicle body so as to be symmetrical to the one on the right side.

The noise shield 20 is formed of a three-dimensional structure made of a bent plate and elongated in the front-rear direction. Specifically, the noise shield 20 has a fixed portion 21 to be fixed to the outer panel 12, and a flap portion 22 to contact the rear bumper 11 when the rear bumper 11 is attached to the vehicle 100. As shown in FIG. 1, a front end of the noise shield 20 is positioned near the wheel arch 16, while a rear end of the noise shield 20 is positioned near the bent portion 11c of the rear bumper 11. Note that the noise shield 20 of the present embodiment is assumed to be a plastic molding made of thermoplastic resin or the like, but the material of the noise shield 20 is not limited thereto.

Figure 3A:
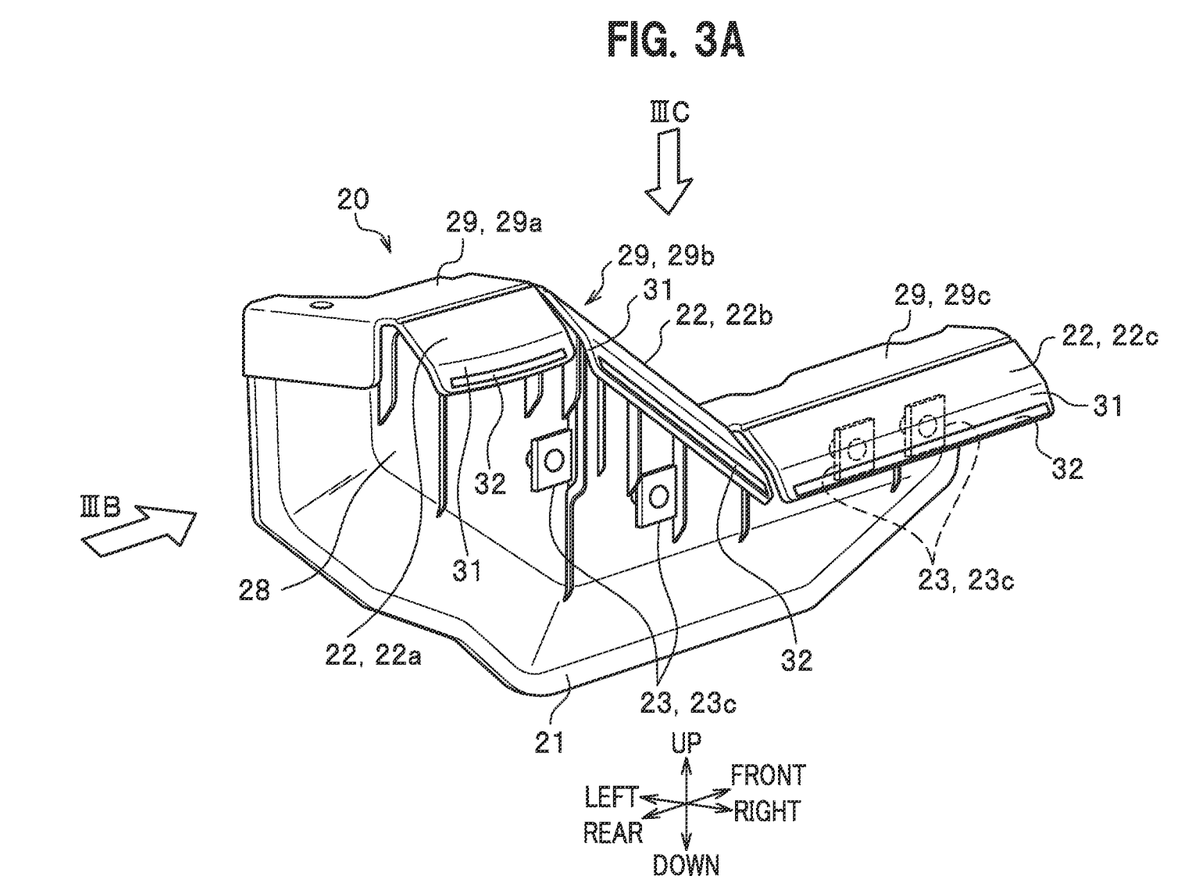
FIG. 3A is a perspective view of the noise shield as a whole.
Figure 3B:
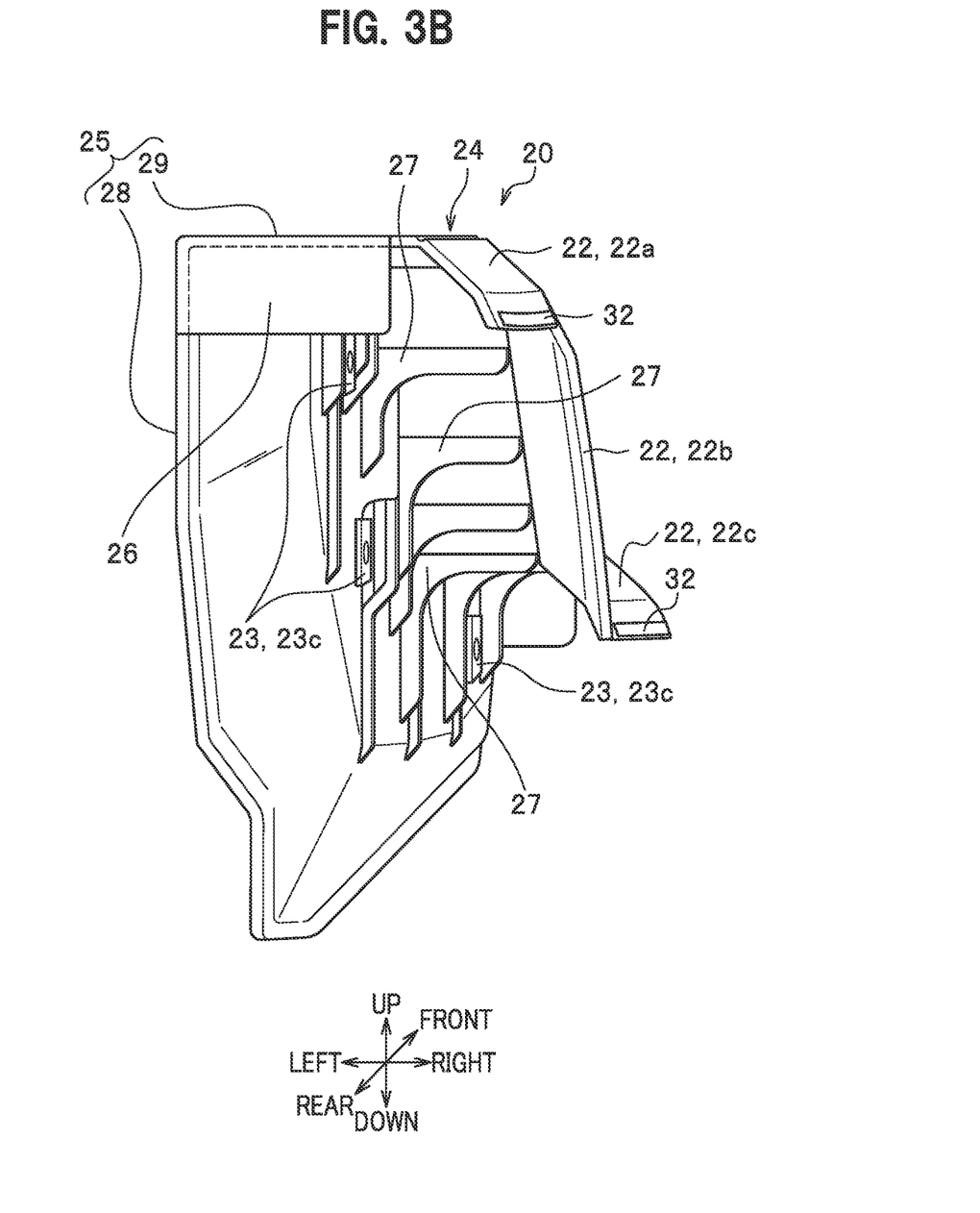
FIG. 3B is a rear view of the noise shield, as viewed from a direction IIIB in FIG. 3A.
Figure 3C:
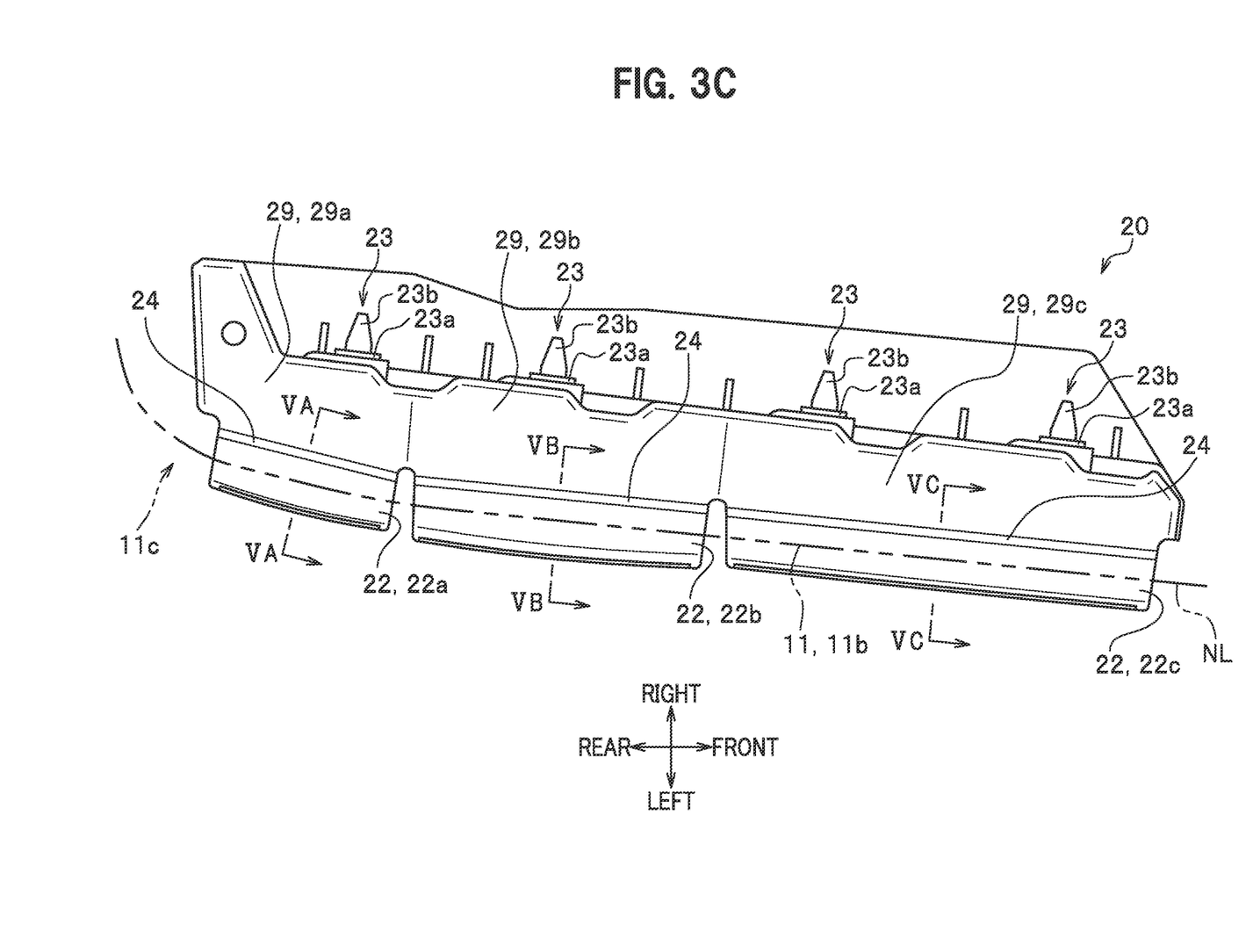
FIG. 3C is a top view of the noise shield, as viewed from a direction IIIC in FIG. 3A.

FIG. 3A is a perspective view of the noise shield 20 as a whole. FIG. 3B is a rear view of the noise shield 20, as viewed from a direction IIIB in FIG. 3A. FIG. 3C is a top view of the noise shield 20, as viewed from a direction IIIC in FIG. 3A. Note that a clip 23 provided so as to correspond to a third flap portion 22c of the noise shield 20 is indicated by a hidden line (dotted line) in FIG. 3A. An extension line NL of the rear bumper 11 (side face 11b) at a position corresponding to the flap portion 22 of the noise shield 20 is added in an imaginary line (phantom line) in FIG. 3C.

The noise shield 20 of the present embodiment includes the fixed portion 21, the flap portion 22, and the clip 23 as shown in FIG. 3A and described above. As shown in FIG. 3B, the fixed portion 21 includes a main part 25 made of a plate bent in an L-shape, a reinforcing plate 26 connected to a rear end of the main part 25 at a corner in an L-shape, and reinforcing ribs 27 aligned in the front-rear direction in an L-shaped inner corner of the main part 25.

The main part 25 is formed substantially in an L-shape with a vertical wall 28 extending in both front-rear and up-down directions and a lateral wall 29 extending in both front-rear and right-left (vehicle width) directions. The reinforcing plate 26 and the reinforcing ribs 27 are arranged so as to connect the vertical wall 28 with the lateral wall 29. Incidentally, the reinforcing rib 27 of the present embodiment also works as a stopper to inhibit excessive turning of the flap portion 22 on a hinge 24, as described below.

The lateral wall 29 is formed to have a first lateral wall 29a, a second lateral wall 29b, and a third lateral wall 29c positioned in order from rear forward, as shown in FIG. 3A. The first lateral wall 29a is formed to extend substantially horizontally at a position vertically higher than the second and third lateral walls 29b, 29c. The third lateral wall 29c is formed to extend substantially horizontally at a position vertically lower than the first and second lateral walls 29a, 29b. The second lateral wall 29b extends at an angle so that its height is gradually decreased from the first lateral wall 29a to the third lateral wall 29c, to connect the first lateral wall 29a with the second lateral wall 29b. Incidentally, the first lateral wall 29a has the shortest length in the front-rear direction among the three, and the third lateral wall 29c has the longest length.

Next, a description is given of the flap portion 22 (see FIG. 2). The flap portion 22 is split into pieces along a surface of the rear bumper 11 on which the noise shield 20 extends, specifically in the front-rear direction of the noise shield 20, as shown in FIG. 2. The flap portion 22 of the present embodiment is made of a plate as shown in FIG. 3A, to include a first flap portion 22a, a second flap portion 22b, and the third flap portion 22c in order from rear of the noise shield 20. The first flap portion 22a has the shortest length in the front-rear direction among the three, and the third flap portion 22c has the longest length.

The first, second, and third flap portions 22a, 22b, 22c each have an inclined section 31 inclined such that a right end (outer end in the vehicle width direction) thereof is displaced more downward with an increasing distance from inside outward in the vehicle width direction. The inclined section 31 has a contact face defined on its upper surface as described below, which contacts the side face 11b (see FIG. 4) of the rear bumper 11 (see FIG. 4) when the rear bumper 11 (see FIG. 4) is attached to the vehicle 100. The inclined section 31 has thus a buffer member 32 attached on its upper surface against the side surface 11b (see FIG. 4), as shown in FIG. 3A. Note that the buffer member 32 of the present embodiment is formed with a tape made of a slippery material, such as urethane resin and silicone resin, arranged along a longitudinal direction of the inclined section 31.

The first flap portion 22a is connected to the first lateral wall 29a via the hinge 24 formed along a left edge (outer edge in the vehicle width direction) of the first lateral wall 29a of the fixed portion 21, as shown in FIG. 3C. The hinge 24 is formed by a connection portion between the first lateral wall 29a and the first flap portion 22a notched so as to be linearly thin-walled, to have a groove (notch) between the first lateral wall 29a and the first flap portion 22a, extending in a longitudinal direction of the noise shield 20. Note that the hinge 24 corresponds to a "flexible portion" in one or more claims.

The hinge 24 as described above is made of a thinner wall than the rest of the first lateral wall 29a, to elastically turn thereon the first flap portion 22a with respect to the first lateral wall 29a. That is, the first flap portion 22a, when released from a load to turn it, restores itself from a turned state to its initial position before the turning. In addition, the second and third flap portions 22b, 22c are respectively connected to the second and third lateral walls 29b, 29c via the hinges 24, as shown in FIG. 3C. The first flap portion 22a has vertically the largest height among the first, second, and third flap portions 22a, 22b, 22c, and the third flap portion 22c has the smallest height, as shown in FIG. 3A.

Next, the clip 23 (see FIG. 3C) is described. The clip 23 is a member to attach, by snap-fit connection, the fixed portion 21 of the noise shield 20 to the outer panel 12 (see FIG. 2). The two or more clips 23 are arranged along a longitudinal direction (front-rear direction) of the lateral wall 29 of the fixed portion 21, as shown in FIG. 3C. The clips 23 are arranged in the present embodiment such that the single clip 23 is used for each of the first and second lateral walls 29a, 29b and a pair of the clips 23 is used for the third lateral wall 29c.

The clip 23 includes a base portion 23a, an engaging portion 23b formed in an arrowhead shape and protruding inward (rightward) in the vehicle width direction from the base portion 23a, and a support portion 23c (see FIG. 3A) to cause the base portion 23a to be supported by the lateral wall 29 of the fixed portion 21. The clip 23 works as a spacer to separate the lateral wall 29 (see FIG. 4) of the fixed portion 21 from the outer panel 12 (see FIG. 4) by a predetermined distance, as described below. Incidentally, the clip 23 for the first lateral wall 29a is vertically located at the highest position among the four clips 23, and the clip 23 for the third lateral wall 29c is located at the lowest position, as shown in FIG. 3A.

Figure 4:
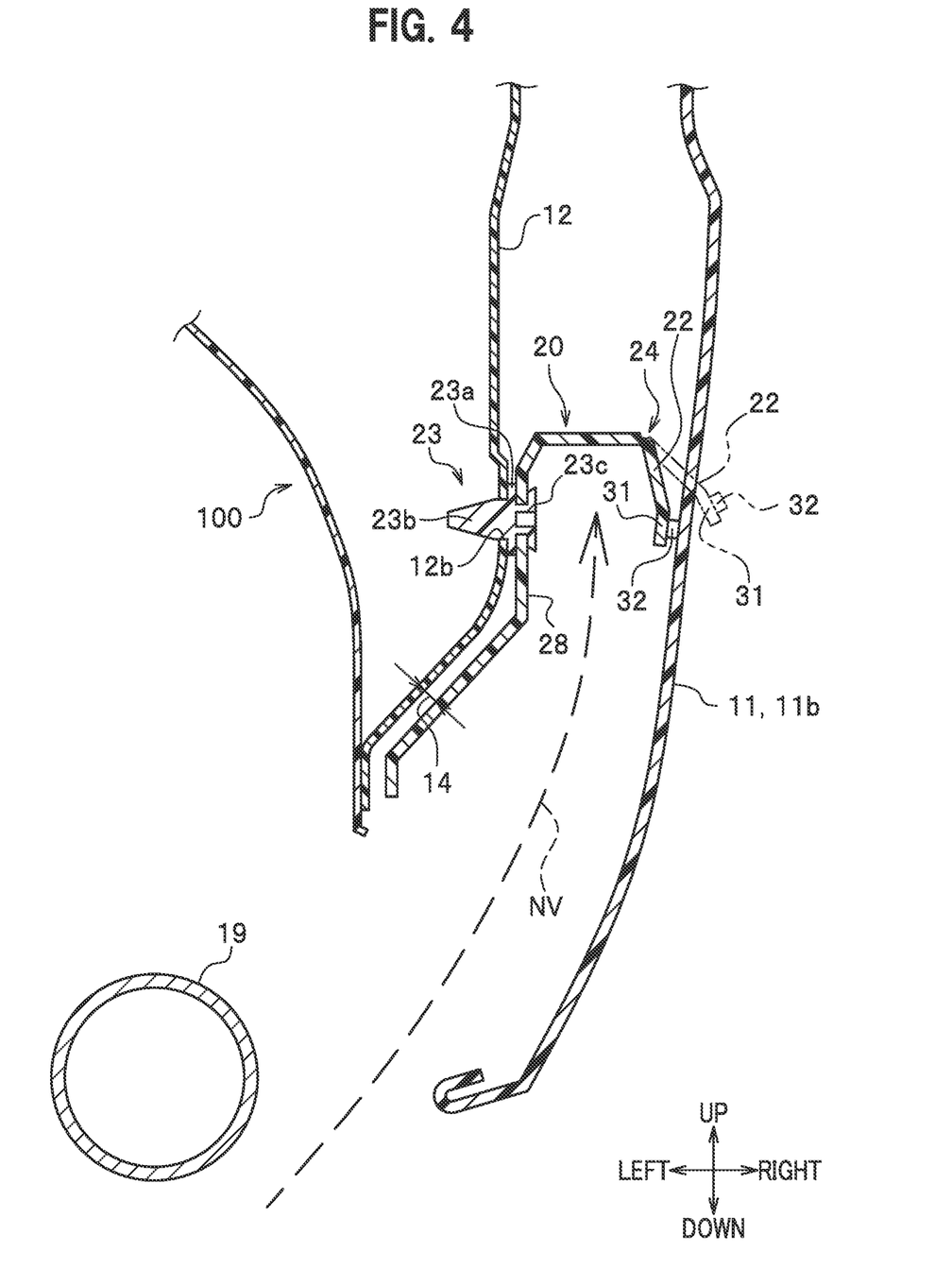
FIG. 4 is a cross-sectional view, taken along a line IV-IV in FIG. 2.

The noise shielding structure 10 of the present embodiment is configured to have the noise shield 20 attached to the outer panel 12 (see FIG. 2) via the clips 23 and to have the rear bumper 11 fixed to the outer panel 12. FIG. 4 is a cross-sectional view, taken along a line IV-IV in FIG. 2. In FIG. 4, the flap portion 22 before deformation on the hinge 24 (flexible portion) is indicated by an imaginary line (phantom line) and the flap portion 22 after deformation is indicated by a solid line. Note that the reference sign 12 indicates the outer panel, the reference sign 11b indicates the side face of the rear bumper 11, the reference sign 20 indicates the noise shield, and the reference sign 19 indicates the exhaust pipe (air release pipe).

The engaging portion 23b of the clip 23 supported at the support portion 23c by the vertical wall 28 is snap-fitted into a mount hole 12b formed in the outer panel 12, as shown in FIG. 4. This causes the noise shield 20 to be attached to the outer panel 12. At this time, the base portion 23a of the clip 23 works as a spacer to separate the outer panel 12 from the vertical wall 28 of the noise shield 20 by a predetermined distance. Incidentally, the vertical wall 28 as described above also works to protect an undercoat layer (rust inhibitor layer) applied to the outer surface of the outer panel 12.

In addition, the vertical wall 28 of the present embodiment extends downward to the vicinity of a lower end of the outer panel 12, in parallel to the outer panel 12, to define a gap 14 between a plate face of the vertical wall 28 and a plate face of the outer panel 12. Incidentally, the gap 14 also works to drain water (such as rainwater and water used for washing the vehicle) penetrated between the outer panel 12 and the side face 11b of the rear bumper 11.

When the rear bumper 11 (see FIG. 1) is fixed to the rear vehicle body, the side face 11b of the rear bumper 11 covers the outer panel 12, having the noise shield 20 attached thereto, from outside in the vehicle width direction (right side in FIG. 4), as shown in FIG. 4. At this time, the flap portion 22 of the noise shield 20 abuts against the side face 11b from inside in the vehicle width direction, to deform on the hinge 24 (flexible portion) from a state indicated by an imaginary line (phantom line) to a state indicated by a solid line in FIG. 4. That is, the flap portion 22 is rotationally displaced on the hinge 24 (flexible portion) so as to be in line with the extension line NL of the rear bumper 11 (side face 11b) indicated by an imaginary line (phantom line) in FIG. 3C. As shown in FIG. 4, the flap portion 22 of the present embodiment is elastically flexible, when it receives a pressing load on the inclined section 31 from the side face 11b of the rear bumper 11. Note that a reference sign 32 in FIG. 4 indicates the buffer member attached to the inclined section 31.

Next, a description is given of advantageous effects of the noise shielding structure 10 of the present embodiment. The noise shielding structure 10 of the present embodiment has the noise shield 20 arranged between the outer panel 12 and the rear bumper 11. In general, road noise is mainly generated by the tire 17 (see FIG. 1) rotating on a road while the vehicle is traveling. Vibration NV involving this road noise is transmitted to a space between the outer panel 12 and the rear bumper 11, as shown in FIG. 4. The vibration NV is then propagated into the rear compartment 18 (see FIG. 1) via the outer panel 12 located further above the space, to disturb quietness in the rear compartment 18.

To cope with this condition, the noise shield 20 (see FIG. 4) in the noise shielding structure 10 of the present embodiment shuts off the vibration NV (see FIG. 4) transmitted to a space between the outer panel 12 (see FIG. 4) and the rear bumper 11 (see FIG. 4). In this manner, the noise shielding structure 10 improves quietness in the rear compartment 18.

In addition, the noise shield 20 (see FIG. 4) in the noise shielding structure 10 of the present embodiment has the flap portion 22 deformable on the hinge 24 (flexible portion) with respect to the fixed portion 21 fixed to the outer panel 12, as shown in FIG. 4. According to the noise shielding structure 10 as described above, even when the distance between the outer panel 12 (see FIG. 4) and the rear bumper 11 (see FIG. 4) varies in vehicle models and/or bumper designs, the flap portion 22 deforms depending on the variation to allow the noise shield 20 to effectively close the gap. The noise shielding structure 10 is versatile without any limitation in vehicle models and/or bumper designs.

Further, in the noise shielding structure 10 of the present embodiment, the flap portion 22 is split into pieces in the front-rear direction, as shown in FIG. 3C. According to the noise shielding structure 10 as described above, the respective pieces of the flap portion 22 independently follow the rear bumper 11, even when gently curved in the front-rear direction (see the extension line NL in FIG. 3C), differently from a single-membered flap portion (not shown), to abut against the rear bumper 11 more reliably. The noise shielding structure 10 more reliably shuts off the vibration NV being transmitted upward. This allows the noise shielding structure 10 to improve quietness in the rear compartment 18 more reliably.

Still further, in the noise shielding structure 10 of the present embodiment, the pieces of the flap portion 22 are provided vertically at different positions. According to the noise shielding structure 10 as described above, positions of fixing the noise shield 20 by the clips 23 may vary due to variance of the shape of the outer panel 112 in vehicle models. However, even in such cases, the noise shielding structure 10 allows the height of the flap portion 22 to be changed in accordance with fixing points of the clips 23, to ensure that the flap portion 22 suitably follows the rear bumper 11. The noise shielding structure 10 has the flap portion 22 abutted against the rear bumper 11 more reliably. This allows the noise shielding structure 10 to improve quietness in the rear compartment 18 more reliably.

Still further, in the noise shielding structure 10 of the present embodiment, the hinge 24 (flexible portion) is formed of a notch. According to the noise shielding structure 10 as described above, the flap portion 22 is more reliably bent with respect to the fixed portion 21. This allows the noise shielding structure 10 to have the flap portion 22 suitably following the rear bumper 11, to suitably keep quietness in the rear compartment 18.

Still further, in the noise shielding structure 10 of the present embodiment, the noise shield 20 is provided above the exhaust pipe 19. According to the noise shielding structure 10 as described above, the noise shield 20 is arranged without any interference with the exhaust pipe 19, differently from a conventional noise shielding structure (see Patent Document 1). According to the noise shielding structure 10 as described above, the noise shield 20 also prevents exhaust noise propagated via the exhaust pipe 19 from being transmitted to the rear compartment 18.

Still further, in the noise shielding structure 10 of the present embodiment, the flap portion 22 has the buffer member 32 provided at a position to abut against the rear bumper 11. According to the noise shielding structure 10 as described above, the flap portion 22 is prevented from generating hitting noise when abutting against the rear bumper 11.

Still further, in the noise shielding structure 10 of the present embodiment, one of the pieces of the flap portion 22 provided near the bent portion 11c of the rear bumper 11 is shorter in the longitudinal direction than the other pieces of the flap portion 22. According to the noise shielding structure 10 as described above, the flap portion 22 more reliably abuts against the rear bumper 11 even near the bent portion 11c, as shown in FIG. 3C, differently from a flap portion (not shown) split into pieces having equal lengths in the front-rear direction. This allows the noise shielding structure 10 to improve quietness in the rear compartment 18 more reliably.

Hereinabove, the present embodiment has been described, but the present invention is not limited thereto and various embodiments are possible.

The noise shield 20 (see FIG. 3A) in the noise shielding structure 10 of the present embodiment is assumed to be molded from a single kind of resin. Then, in the present embodiment, the fixed portion 21 is assumed to have substantially the same degree of hardness and rigidity as those of the flap portion 22. However, the fixed portion 21 and the flap portion 22 may be made by two-color molding, for example, to increase the degree of hardness and rigidity of the fixed portion 21 as compared with those of the flap portion 22.

According to the noise shielding structure 10 as described above, the fixed portion 21 is solidly fixed to the outer panel 12 and the flap portion 22 is made flexible so as to flexibly abut against the outer panel 12. Incidentally, stiffness adjustment between the fixed portion 21 and the flap portion 22 may be achieved by selecting materials, such as by two-color molding as described above, but may also be achieved by adjusting plate thicknesses of the fixed portion 21 and the flap portion 22 or by varying structures such as one provided with a reinforcing member and the other not.

The depth of the notch forming the hinge 24 (flexible portion) of the present embodiment is assumed to be equal in each piece of the flap portion 22 split into pieces. However, the depth of the notch forming the hinge 24 (flexible portion) may be changed for each piece of the flap portion 22 split into pieces, even though not shown. According to the noise shielding structure 10 as described above, a bending elastic force of the hinge 24 (flexible portion) can be adjusted for each piece of the flap portion 22 split into pieces.

Figure 5A:
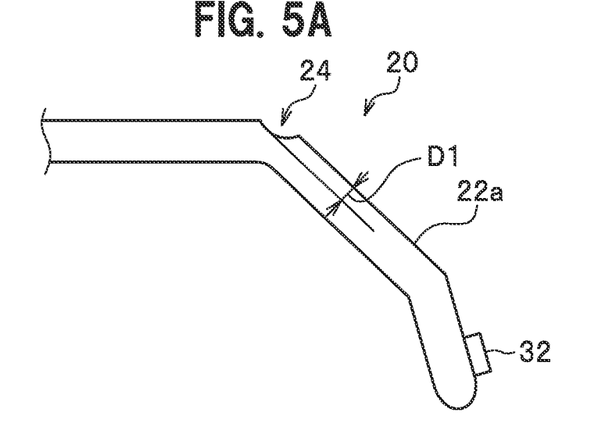
FIG. 5A is a cross-sectional view of a noise shield according to a modification of the embodiment, to show a cross section corresponding to one taken along a line VA-VA in FIG. 3C showing the noise shield of the embodiment.
Figure 5B:
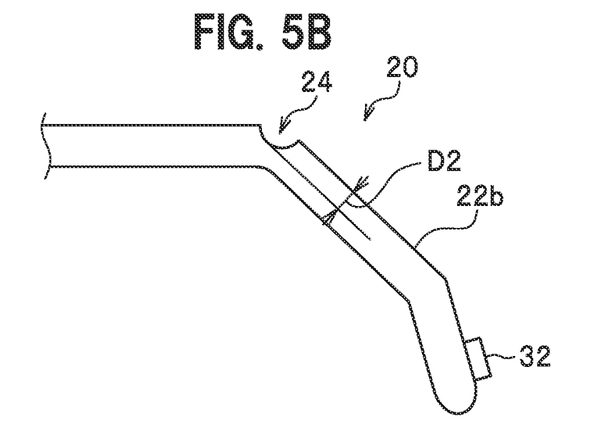
FIG. 5B is a cross-sectional view of the noise shield according to the modification, to show a cross section corresponding to one taken along a line VB-VB in FIG. 3C showing the noise shield of the embodiment.
Figure 5C:
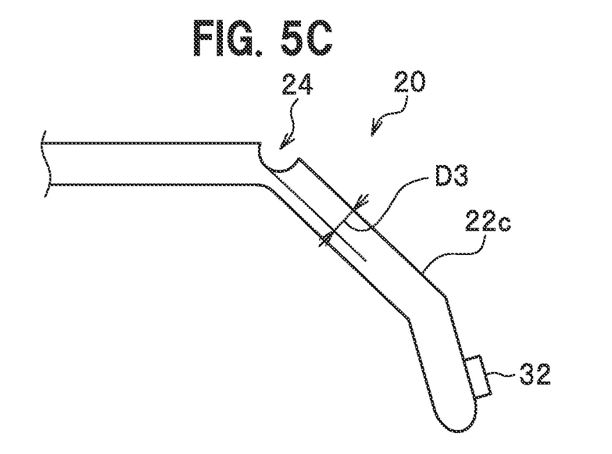
FIG. 5C is a cross-sectional view of the noise shield according to the modification, to show a cross section corresponding to one taken along a line VC-VC in FIG. 3C showing the noise shield of the embodiment.

FIG. 5A referred to below is a partial cross-sectional view of the noise shield 20 according to a modification, to show a partial cross section corresponding to one taken along a line VA-VA in FIG. 3C showing the noise shield 20 of the present embodiment, FIG. 5B is a partial cross-sectional view thereof, to show a partial cross section corresponding to one taken along a line VB-VB in FIG. 3C, and FIG. 5C is a partial cross-sectional view thereof, to show a cross section corresponding to one taken along a line VC-VC in FIG. 3C.

As shown in FIGS. 5A to 5C, a depth D1 (see FIG. 5A) of a notch of the hinge 24 (flexible portion) for the first flap portion 22a of the noise shield 20 according to the modification, a depth D2 (see FIG. 5B) of a notch of the hinge 24 (flexible portion) for the second flap portion 22b, and a depth D3 (see FIG. 5C) of a notch of the hinge 24 (flexible portion) for the third flap portion 22c, when compared with each other, have a relationship of D1<D2<D3. In addition, a longitudinal length L1 (not shown) of the first flap portion 22a (see FIG. 3C), a longitudinal length L2 (not shown) of the second flap portion 22b (see FIG. 3C), and a longitudinal length L3 (not shown) of the third flap portion 22c (see FIG. 3C), when compared with each other, have a relationship of L1<L2<L3.

That is, the depth D1 of the notch for the first flap portion 22a, having the shortest longitudinal length L1, is the shallowest. Accordingly, the first flap portion 22a is provided with the hinge 24 having the thickest wall, to have the largest elastic restoring force per unit length. In contrast, the depth D3 of the notch for the third flap portion 22c, having the longest longitudinal length L3, is the deepest. Accordingly, the third flap portion 22c is provided with the hinge 24 having the thinnest wall, to have the smallest elastic restoring force per unit length. An elastic restoring force per unit length for the second flap portion 22b is middle as compared with those for the first and third flap portions 22a, 22c. This means that the depths (D1, D2, D3) of notches of the hinges 24 may be adjusted depending on the lengths (L1, L2, L3) of pieces of the flap portion 22, as described above, to equalize loads obtained by multiplying restoring forces per unit length for pieces of the flap portion 22 by lengths of pieces of the flap portion 22, respectively. This allows the flap portion 22 to have reaction forces, receiving at pieces thereof from the rear bumper 11 to abut against, equalized.

In addition, the depth of a notch of the hinge 24 (flexible portion) for the first flap portion 22a provided near the bent portion 11c of the rear bumper 11 may be made deeper than the depths of notches of the hinges 24 (flexible portion) for the second and third flap portions 22b, 22c, even though not shown. According to the noise shield 20 as described above, the first flap portion 11a is easily bent, even at the bent portion 11c where the flap portion 22 is less likely bent on the hinge 24 (flexible portion), to abut against the rear bumper 11.

LIST OF REFERENCE SIGNS

10: noise shielding structure, 11: rear bumper, 11c: bent portion, 12: outer panel, 19: exhaust pipe, 20: noise shield, 21: fixed portion, 22: flap portion, 22a: first flap portion (flap portion), 22b: second flap portion (flap portion), 22c: third flap portion (flap portion), 24: hinge (flexible portion), 32: buffer member, 100: vehicle, D1: depth of notch, D2: depth of notch, D3: depth of notch, L1: length of flap portion, L2: length of flap portion, and L3: length of flap portion.

What is claimed is:

1. A noise shielding structure comprising:
an outer panel at a rear vehicle body;
a rear bumper provided so as to cover the outer panel; and
a noise shield arranged between the outer panel and the rear bumper,
wherein the noise shield includes a fixed portion to be fixed to the outer panel, a flap portion to contact the rear bumper when the rear bumper is attached to the rear vehicle body, and a flexible portion provided between the fixed portion and the flap portion,
the flap portion abuts on a back side of the rear bumper so as to be turned and deformable about the flexible portion, and
the flap portion is split into pieces along a surface of the rear bumper.

2. The noise shielding structure as claimed in claim 1, wherein the pieces of the flap portion are provided vertically at different positions.

3. The noise shielding structure as claimed in claim 1, wherein the flexible portion is formed of a notch between the fixed portion and the flap portion.

4. The noise shielding structure as claimed in claim 1: wherein the noise shield is provided above an exhaust pipe.

5. The noise shielding structure as claimed in claim 1, wherein the flap portion has a buffer member provided at a position to abut against the rear bumper.

6. The noise shielding structure as claimed in claim 1, wherein
the surface of the rear bumper, facing the outer panel, has a bent portion formed to be displaced more inward in a vehicle width direction toward the rear vehicle body, and
a piece of the flap portion provided near the bent portion of the rear bumper is shorter in a direction extending along the surface of the rear bumper than other pieces of the flap portions.

7. The noise shielding structure as claimed in claim 1, wherein the noise shield is made such that a degree of hardness of the fixed portion is increased as compared with that of the flap portion.

8. The noise shielding structure as claimed in claim 3, wherein the flap portion is split into pieces in a direction along the surface of the rear bumper, and the depth of the notch is different for each piece of the flap portion.

9. The noise shielding structure as claimed in claim 8, wherein the depth of the notch is different according to a length, in the direction along the surface of the rear bumper, of a piece of the flap portion, and the depth of the notch for a piece of the flap portion having a shorter length is shallower than that for a piece of the flap portion having a longer length.

10. The noise shielding structure as claimed in claim 8, wherein
the surface of the rear bumper, facing the outer panel, has a bent portion formed to be displaced more inward in a vehicle width direction toward the rear vehicle body, and
the depth of the notch for a piece of the flap portion provided near the bent portion of the rear bumper is deeper than the depths of the notches for other pieces of the flap portions.

* * * * *